UNITED STATES PATENT OFFICE.

JOHN WINFIELD STEVENSON, OF GOLDFIELD, NEVADA.

PRESERVING COMPOUND.

971,799. Specification of Letters Patent. Patented Oct. 4, 1910.

No Drawing. Application filed March 18, 1909. Serial No. 484,227.

*To all whom it may concern:*

Be it known that I, JOHN WINFIELD STEVENSON, a citizen of the United States, residing at Goldfield, county of Esmeralda, and State of Nevada, have invented a certain new and useful Preserving Compound, of which the following is a specification.

This invention relates to preserving compounds and has for its object the provision of a composition of inexpensive and easily compounded ingredients which, when applied to hams or bacon, or other meat, will efficiently preserve such food and prevent the formation of the mold which so commonly exists on meats of this class.

To forty pounds of unslaked lime there is added twenty pounds of pulverized charcoal, five pounds of salt, and thirty-five gallons of water. These are mixed well until the water has thoroughly assimilated the other ingredients. I then separately mix three pounds of sulfur and eight pounds of unslaked lime and after such mixture add thereto four gallons of water, the sulfur, lime and water being boiled for about three hours. The two foregoing mixtures are then brought together and mixed well, the resulting compound being of black color and fluid consistency.

In applying the preservative to the ham or bacon, the meat is first covered with a cloth and is then dipped in the compound and hung up to dry, and I have found that it is a certain preservative and preventive of mold.

Having thus described my invention, what I claim as new and desire to secure by Letters Patent, is:—

A mold preventing mixture of fluid consistency, consisting of lime, charcoal, salt, sulfur, and water combined in the proportions and the manner set forth.

In testimony whereof, I have hereunto affixed my signature in presence of two witnesses.

JOHN WINFIELD STEVENSON.

Witnesses:
JOSEPH G. DUGGAN,
WARREN S. SPEER.